United States Patent
Sathianathan et al.

(10) Patent No.: US 6,394,746 B1
(45) Date of Patent: May 28, 2002

(54) GAS TURBINE ENGINE BLADE CONTAINMENT ASSEMBLY

(75) Inventors: Sivasubramaniam K Sathianathan, Burton on Trent; Ian G Martindale; Michael R Lawson, both of Derby, all of (GB)

(73) Assignee: Rolls-Royce plc, London (GB)

( * ) Notice: Subject to any disclaimer, the term of this patent is extended or adjusted under 35 U.S.C. 154(b) by 17 days.

(21) Appl. No.: 09/665,579

(22) Filed: Sep. 18, 2000

(30) Foreign Application Priority Data

Sep. 25, 1999 (GB) .............................. 9922618

(51) Int. Cl.$^7$ .............................................. F01D 21/00
(52) U.S. Cl. ...................... 415/9; 415/173.4; 415/215.1
(58) Field of Search ....................... 415/9, 173.1, 173.4, 415/174.4, 200, 214.1, 215.1

(56) References Cited

U.S. PATENT DOCUMENTS

| | | | |
|---|---|---|---|
| 4,534,698 A | * | 8/1985 | Tomich ............................ 415/9 |
| 4,666,371 A | | 5/1987 | Alderson |
| 4,705,454 A | * | 11/1987 | Bouiller ........................ 415/197 |
| 5,160,248 A | | 11/1992 | Clarke |
| 5,163,809 A | | 11/1992 | Akgun |
| 5,336,044 A | | 8/1994 | Forrester |
| 5,408,826 A | * | 4/1995 | Stewart et al. ............... 60/226.1 |
| 5,447,411 A | | 9/1995 | Curley |
| 5,482,429 A | * | 1/1996 | Penda ............................ 415/9 |
| 5,485,723 A | * | 1/1996 | McCoy et al. .............. 60/226.1 |
| 5,486,086 A | * | 1/1996 | Bellia et al. .................... 415/9 |
| 5,513,949 A | * | 5/1996 | Armstrong ...................... 415/9 |
| 5,516,258 A | * | 5/1996 | Newton .......................... 415/9 |
| 5,885,056 A | * | 3/1999 | Goodwin ........................ 415/9 |
| 6,053,696 A | * | 4/2000 | Roberts .......................... 415/9 |
| 6,059,524 A | * | 5/2000 | Costa et al. .................... 415/9 |
| 6,206,631 B1 | * | 3/2001 | Schilling ........................ 415/9 |

FOREIGN PATENT DOCUMENTS

| | | |
|---|---|---|
| GB | 851323 SP | 10/1960 |
| GB | 2 114 233 A | 8/1983 |
| GB | 2 281 941 A | 3/1995 |

* cited by examiner

*Primary Examiner*—Edward K. Look
*Assistant Examiner*—Richard A Edgar
(74) *Attorney, Agent, or Firm*—W. Warren Taltavull; Manelli Denison & Selter PLLC

(57) ABSTRACT

A gas turbine engine rotor blade containment assembly (38) comprising a generally cylindrical, or frustoconical, first metal casing (40) and a plurality of generally cylindrical, or frustoconical axially spaced second metal casing is (54, 56 & 58). The second metal casings (54, 56, 58) surrounded and abut the first metal casing (40). The first metal casing (40) is relatively hard and tough to contain a fan blade (34). The second metal casings (54, 56, 58 are relatively soft and lightweight to stiffen the first metal casing (40) and fan blade containment regions (A, B & C). The second metal casing (54, 56, 58) are arranged coaxially with the first metal casing (40). One of the second metal casing means (56) is in a plane (Y) containing the fan blades (34) of the gas turbine engine (10). The first metal casing (40) comprises steel and the second metal casing is (54, 56, 58) comprise aluminum. The fan blade containment assembly (38) is lighter for large diameter turbofan gas turbine engine (10).

17 Claims, 1 Drawing Sheet

GAS TURBINE ENGINE BLADE CONTAINMENT ASSEMBLY

FIELD OF THE INVENTION

The present invention relates to gas turbine engine casings, particularly gas turbine engine fan casings and turbine casings, more particularly to an improved blade containment assembly for use within or forming a part of the gas turbine engine casing.

BACKGROUND OF THE INVENTION

Turbofan gas turbine engines for powering aircraft conventionally comprise a core engine, which drives a fan. The fan comprises a number of radially extending fan blades mounted on a fan rotor enclosed by a generally cylindrical fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, the relatively thick containment casings are relatively heavy, the relatively thin casings enclosed by the fibrous material are lighter but are more expensive to manufacture. The relatively thick casings with fibrous material are both heavier and more expensive to manufacture.

It is known to provide a hard metallic liner within the thin metallic casing having a fibrous material wound around the think metallic casing. The hard metallic liner is positioned upstream of the fan blades and comprises a radially inwardly extending flange arranged to deflect detached fan blades radially outwardly so that the fan blades pass through the casing to be contained by the fibrous material.

Accordingly the present invention seeks to provide a novel gas turbine engine casing which overcomes the above mentioned problems.

Accordingly the present invention provides a gas turbine engine rotor blade containment assembly comprising a generally cylindrical, or frustoconical, first metal casing, the first metal casing having different axially spaced gas turbine engine rotor blade containment regions, at least one generally cylindrical, or frustoconical, second metal casing, the at least one second metal casing surrounding and abutting the first metal casing, the first metal casing being relatively hard and tough to contain a gas turbine engine rotor blade, the at least one second metal casing being relatively soft and lightweight to stiffen the first metal casing in a gas turbine engine rotor blade containment region.

Preferably the at least one second metal casing is arranged coaxially with the first metal casing.

Preferably there are a plurality of second metal casings, the second metal casings being axially spaced along the first metal casing to support the first metal casing in different gas turbine engine rotor blade containment regions.

Preferably the at least one second metal casing is in a plane containing the rotor blades of the gas turbine engine.

SUMMARY OF THE INVENTION

At least one second metal casings may be axially downstream of the plane containing the rotor blades of the gas turbine engine.

One of the second metal casings is axially upstream of the plane containing the rotor blades of the gas turbine engine.

Preferably the at least one second metal casing has ribs and/or blind apertures.

Preferably one or more continuous layers of a strong fibrous material are wound around the at least one second metal casing and first metal casing.

Preferably the first metal casing comprises a steel alloy or a nickel alloy.

Preferably the second metal casing comprises aluminium or an aluminium alloy.

Preferably an acoustic lining is provided within the first metal casing.

The present invention also provides a gas turbine engine comprising a rotor carrying a plurality of rotor blades, a rotor blade containment assembly comprising a generally cylindrical, or frustoconical, first metal casing, the first metal casing being arranged coaxially around the rotor and rotor blades, the first metal casing having different axially spaced gas turbine engine rotor blade containment regions, at least one generally cylindrical, or frustoconical, second metal casing, the at least one second metal casing surrounding and abutting the first metal casing, the first metal casing being relatively hard and tough to contain a gas turbine engine rotor blade, the at least one second metal casing being relatively soft and lightweight to stiffen the first metal casing in a gas turbine engine rotor blade containment region.

DESCRIPTION OF THE DRAWINGS

The present invention will be more fully described by way of example with reference to the accompanying drawings in which.

DESCRIPTION OF THE INVENTION

Figure 1:
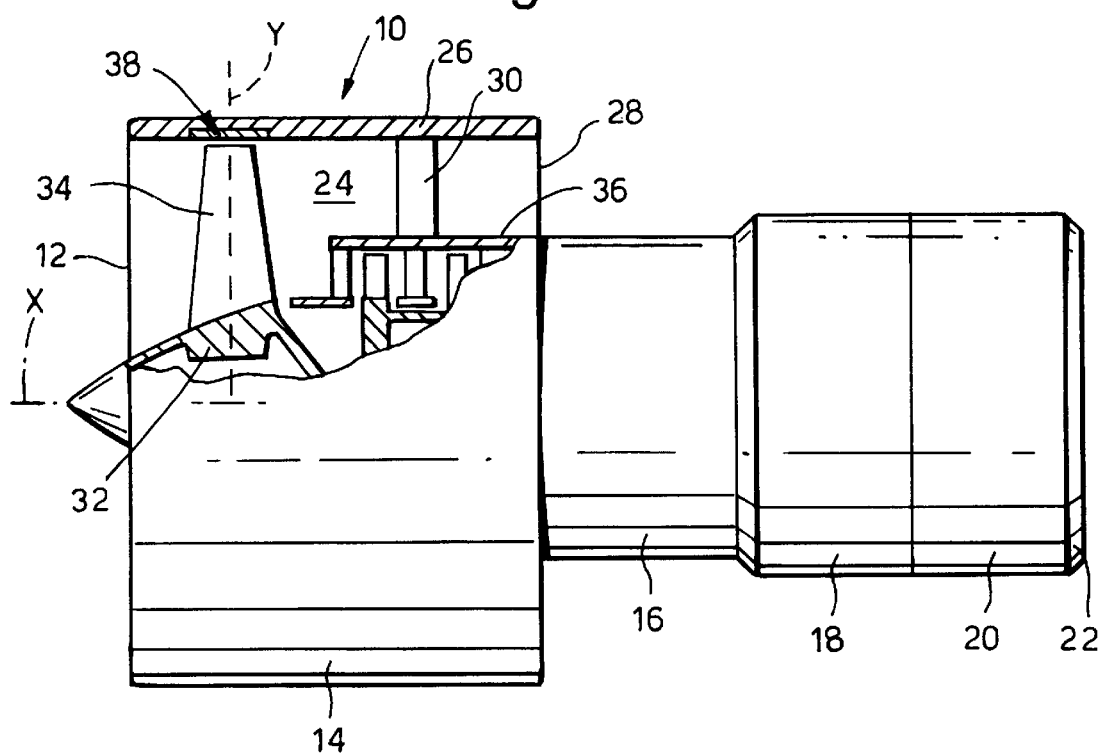
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane of the fan blades 34.

Figure 2:
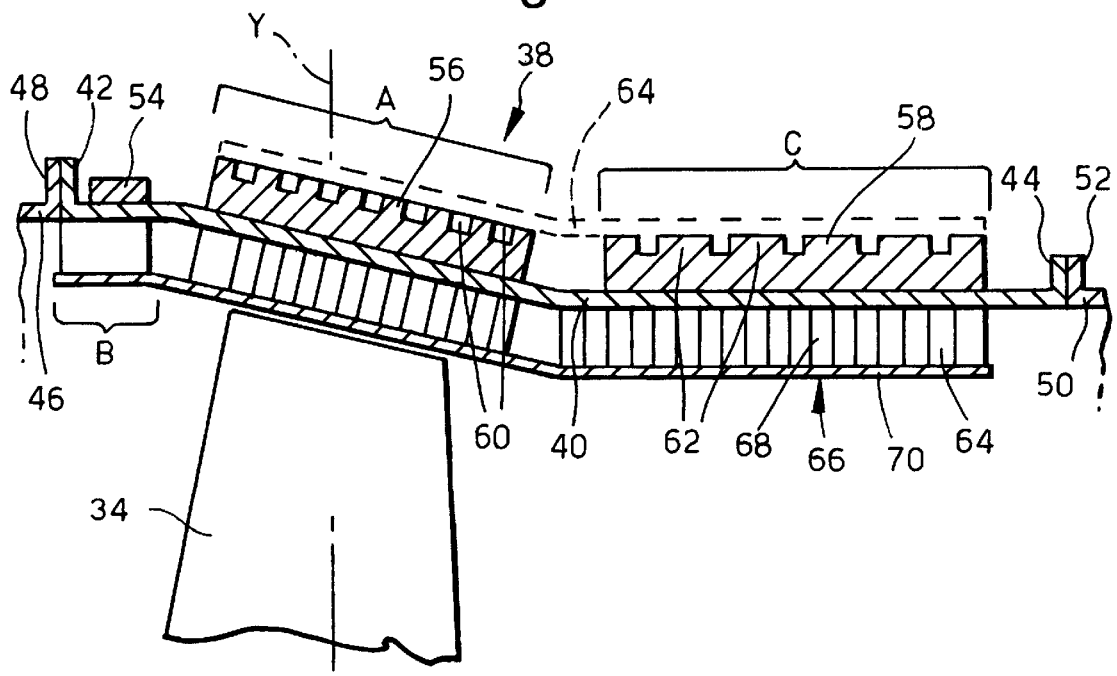
FIG. 2 is an enlarged view of the fan blade containment assembly shown in FIG. 1.

The fan casing 26 and fan blade containment assembly 38 is shown more clearly in FIG. 2. The fan blade containment assembly 38 comprises a first metal cylindrical, or frustoconical, casing 40. The first metal casing 40 comprises an upstream flange 42 by which the fan blade containment assembly 38 is connected to a flange 48 on an intake assembly 46 of the fan casing 26. The first metal casing 40 also comprises a downstream flange 44 by which the fan blade containment assembly 38 is connected to a flange 52 on a rear portion 50 of the fan casing 26.

The fan blade containment assembly 38 also comprises a plurality of generally cylindrical, or frustoconical, axially spaced second metal casings 54, 56 and 58. The second metal casing whose 54, 56 and 58 surrounded and a but the first metal casing 40. The first metal casing 40 is relatively hard and tough to contain a gas turbine engine fan blade 34. The second metal casings 54, 56 and 58 are relatively soft and lightweight to stiffen the first metal casing 40 in axially spaced fan blade containment regions A, B and C. The second metal casings 54, 56 and 58 provide sufficient localized stiffness to enhance the fan blade 34 and debris containment by the first metal casing 40.

The fan blade containment region A is substantially in the plane Y containing the fan blades 34. The fan blade containment region B is upstream of the plane Y of the fan blades 34 and downstream of the flange 42, where debris protection is required for the fan blade containment assembly 38. The fan blade containment region C is downstream of the plane Y of the fan blades 34, where a root of a fan blade 34 impacts the fan blade containment assembly 38.

The first metal casing 40 provides the basic fan blade containment and provides a connection between the intake casing 46 and the rear casing 50. The second metal casings 54, 56 and 58 locally increase the stiffness of the first metal casing 40. The second metal casing 54 is a plain solid metal casing. The second metal casings 56 and 58 are provided with blind holes 60 and circumferential ribs 62 respectively to reduce the weight of the second metal casings 56 and 58. The second metal casings may comprise an isogrid of ribs, extending at 60° to each other, for example some ribs may extend circumferentially or axially and at 60° to the circumferential or axial direction. The number, size and location of the blind holes 60 and 62 may be varied to vary the stiffness of the first metal casing 40.

It may be desirable in some circumstances to provide a number of continuous layers of a strong fibrous material 64 wound around the first and second metal casings 40, 54, 56 and 58 and to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the thin first and second metal casings 40, 54, 56 and 58 and the continuous layers of fibrous material 64.

An acoustic lining 66 may be provided on the inner surface of the first metal casing 40. The acoustic lining 66 comprises a honeycomb 68 and a perforate sheet 70. The honeycomb 68 and perforate sheet 70 are quite conventional.

The fan blade containment assembly 38 may be manufactured by shrink fitting the second metal casings 54, 56 and 58 onto the first metal casing 40. Alternatively the fan blade containment assembly 38 may be manufactured by bonding, for example diffusion bonding, the second metal casings 54, 56 and 58 onto the first metal casing 40. Additionally fan blade containment assembly 38 may be manufactured by securing the second metal casings 54, 56 and 58 onto the first metal casing 40 using mechanical fasteners, for example nuts and bolts/studs.

In operation of the gas turbine engine 10, in the event that a fan blade 34, or a portion of a fan blade 34, becomes detached it encounters the first metal casing 40. The first metal casing 40 is impacted by the fan blade 34, or portion of the fan blade 34, and effectively removes energy from the fan blade 34, or portion of the fan blade 34.

The fan blade containment assembly of the present invention has several advantages. The hard and tough first metal casing reduces, preferably eliminates, dynamic crack propagation during a fan blade off event. The softer and lighter second metal casing provides stiffness and supports the first metal casing in the event of a crack in the first metal casing. The fan blade containment assembly of the present invention is significantly lighter than conventional fan blade containment assemblies, especially on relatively large diameter turbofan gas turbine engines. The location of the second metal casings allows the casing stiffness to be varied to optimize fan blade containment with minimum waste of material. The manufacturing techniques are low cost and well developed.

The first metal casing may be manufactured from a nickel alloy or preferably from a steel alloy. The second metal casings may be manufactured from aluminium or an aluminium alloy.

The invention has been described with reference to a plurality of second metal casings at a plurality of fan blade containment regions, however the invention is also applicable to a single second metal casing at a single fan blade containment region. For example a single second metal casing may be positioned substantially in the plane of the fan blades.

The invention has been described with reference to a fan blade containment assembly, however it is equally applicable to a compressor blade containment assembly and a turbine blade containment assembly.

What is claimed is:

1. A gas turbine engine rotor blade containment assembly comprising a generally cylindrical, or frustoconical, first metal casing, the first metal casing having different axially spaced gas turbine engine rotor blade containment regions, at least one generally cylindrical, or frustoconical, second metal casing, the at least one second metal casing surrounding and abutting the first metal casing, the at least one second metal casing having an inner surface and the first metal casing having an outer surface, the inner surface of the at least one second metal casing abutting the outer surface of the first metal casing, the first metal casing being relatively hard and tough to contain a gas turbine engine rotor blade, the at least one second metal casing being relatively soft and lightweight to stiffen the first metal casing in a gas turbine engine rotor blade containment region.

2. A gas turbine engine rotor blade containment assembly as claimed in claim 1 wherein the at least one second metal casing is arranged coaxially with the first metal casing.

3. A gas turbine engine rotor blade containment assembly as claimed in claim 1 wherein there are a plurality of second metal casings, the second metal casings being axially spaced along the first metal casing to support the first metal casing in different gas turbine engine rotor blade containment regions.

4. A gas turbine engine rotor blade containment assembly as claimed in claim 1 wherein the at least one second metal casing is in a plane containing the rotor blades of the gas turbine engine.

5. A gas turbine engine rotor blade containment assembly as claimed in claim 1 wherein the at least one second metal casing is axially downstream of the plane containing the rotor blades of the gas turbine engine.

6. A gas turbine engine rotor blade containment assembly as claimed in claim 1 wherein the at least one second metal casing is arranged coaxially with the first metal casing.

7. A gas turbine engine rotor blade containment assembly as claimed in claim 1 wherein the at least one second metal casing has ribs and/or blind apertures.

8. A gas turbine engine rotor blade containment assembly as claimed in claim 1 wherein one or more continuous layers of a strong fibrous material are wound around the at least one second metal casing and first metal casing.

9. A gas turbine engine rotor blade containment assembly as claimed in claim 1 wherein the first metal casing comprises a steel alloy or a nickel alloy.

10. A gas turbine engine rotor blade containment assembly as claimed in claim 1 wherein the second metal casing comprises aluminium or an aluminium alloy.

11. A gas turbine engine rotor blade containment assembly as claimed in claim 1 wherein an acoustic lining is provided within the first metal casing.

12. A gas turbine engine rotor blade containment assembly as claimed in claim 1 wherein the at least one second metal casing is mechanically fastened to the first metal casing.

13. A gas turbine engine rotor blade containment assembly comprising a generally cylindrical, or frustoconical, first metal casing, the first metal casing having different axially spaced gas turbine engine rotor blade containment regions, at least one generally cylindrical, or frustoconical, second metal casing, the at least one second metal casing surrounding and abutting the first metal casing, the first metal casing being relatively hard and tough to contain a gas turbine engine rotor blade, the at least one second metal casing being relatively soft and lightweight to stiffen the first metal casing in a gas turbine engine rotor blade containment region, wherein the at least one second metal casing is bonded to the first metal casing.

14. A gas turbine engine comprising a rotor having a plurality of rotor blades, a rotor blade containment assembly comprising a generally cylindrical, or frustoconical, first metal casing, the first metal casing being arranged coaxially around the rotor and rotor blades, the first metal casing having different axially spaced gas turbine engine rotor blade containment regions, at least one generally cylindrical or frustoconical, second metal casing, the at least one second metal casing surrounding and abutting the first metal casing, the at least one second metal casing having an inner surface and the first metal casing having an outer surface, the inner surface of the at least one second metal casing abutting the outer surface of the first metal casing, the first metal casing being relatively hard and tough to contain a gas turbine engine rotor blade, the at least one second metal casing being relatively soft and lightweight to stiffen the first metal casing in a gas turbine engine rotor blade containment region.

15. A gas turbine engine comprising a rotor carrying a plurality of rotor blades, a rotor blade containment assembly comprising a generally cylindrical or frustoconical, first metal casing, the first metal casing being arranged coaxially around the rotor and rotor blades, at least one generally cylindrical or frustoconical, second metal casing, the at least one second metal casing surrounding and abutting the first metal casing, the at least one second metal casing being arranged in a plane containing the rotor blades, the at least one second metal casing having an inner surface and the first metal casing having an outer surface, the inner surface of the at least one second metal casing abutting the outer surface of the first metal casing, the first metal casing being relatively hard and tough to contain a gas turbine engine rotor blade, the at least one second metal casing being relatively soft and lightweight to stiffen the first metal casing in a gas turbine engine rotor blade containment region in the plane containing rotor blades.

16. A gas turbine engine comprising a rotor carrying a plurality of rotor blades, a rotor blade containment assembly comprising a generally cylindrical, or frustoconical, first metal casing, the first metal casing being arranged coaxially around the rotor and rotor blades, at least one generally cylindrical, or frustoconical, second metal casing, the at least one second metal casing surrounding and abutting the first metal casing, the at least one second metal casing being arranged axially downstream of a plane containing the rotor blades, the at least one second metal casing having an inner surface and the first metal casing having an outer surface, the inner surface of the at least one second metal casing abutting the outer surface of the first metal casing, the first metal casing being relatively hard and tough to contain a gas turbine engine rotor blade, the at least one second metal casing being relatively soft and lightweight to stiffen the first metal casing in a gas turbine engine rotor blade containment region downstream of a plane containing rotor blades.

17. A gas turbine engine rotor blade containment assembly comprising a generally cylindrical, or frustoconical, first metal casing, the first metal casing having different axially spaced gas turbine engine rotor blade containment regions, at least one generally cylindrical, or frustoconical, second metal casing, the at least one second metal casing surrounding and abutting the first metal casing, the first metal casing being relatively hard and tough to contain a gas turbine engine rotor blade, the at least one second metal casing being relatively soft and lightweight to stiffen the first metal casing in a gas turbine engine rotor blade containment region, there being a plurality of second metal casings, the second metal casings being axially spaced along the first metal casing to support the first metal casing in different gas turbine engine rotor blade containment regions, one of the second metal casings being axially upstream of the plane containing the rotor blades of the gas turbine engine.

* * * * *